United States Patent
Bugnon et al.

(10) Patent No.: US 7,621,994 B2
(45) Date of Patent: Nov. 24, 2009

(54) PREPARATIONS OF PTERIDINE PIGMENTS

(75) Inventors: Philippe Bugnon, Le Mouret (CH); Karin Karrer, Pfeffingen (CH); Marcel Hahn, Magden (CH); Werner Sieber, Riehen (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 402 days.

(21) Appl. No.: 11/631,082

(22) PCT Filed: Jun. 20, 2005

(86) PCT No.: PCT/EP2005/052844

§ 371 (c)(1), (2), (4) Date: Dec. 28, 2006

(87) PCT Pub. No.: WO2006/003093

PCT Pub. Date: Jan. 12, 2006

(65) Prior Publication Data

US 2008/0295733 A1    Dec. 4, 2008

(30) Foreign Application Priority Data

Jun. 30, 2004   (EP) ................... 04103060

(51) Int. Cl.
*C09B 57/00* (2006.01)
*C09B 17/00* (2006.01)
*C09D 11/02* (2006.01)

(52) U.S. Cl. .................. 106/498; 106/31.77; 524/100; 544/251

(58) Field of Classification Search ............. 106/31.77, 106/498; 524/100; 544/251
See application file for complete search history.

(56) References Cited

U.S. PATENT DOCUMENTS

| | | | |
|---|---|---|---|
| 4,701,455 A | 10/1987 | Nichol et al. | 514/249 |
| 6,120,956 A | 9/2000 | Eichenberger et al. | 430/106 |
| 6,126,735 A | 10/2000 | Eichenberger et al. | 106/498 |
| 6,600,042 B1 | 7/2003 | Eichenberger et al. | 544/251 |

FOREIGN PATENT DOCUMENTS

| | | |
|---|---|---|
| WO | 98/18866 | 5/1998 |
| WO | 99/55707 | 11/1999 |
| WO | 00/31079 | 6/2000 |

*Primary Examiner*—Anthony J Green
(74) *Attorney, Agent, or Firm*—Joseph C. Suhadolnik

(57) ABSTRACT

The present invention relates to a pigment preparation that comprises, as component (A), 2,4,5,7-tetraminopyrimido[5,4g]pteridine of formula (1), as component (B), a phosphate compound, and optionally, as component (C), further additives, to a process for the production thereof and to the use thereof for colouring high molecular weight organic material and in the production of printing colorants, printing pastes or printing inks.

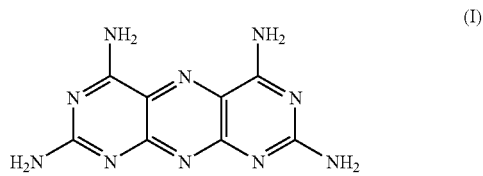

(I)

18 Claims, No Drawings

PREPARATIONS OF PTERIDINE PIGMENTS

The present invention relates to a novel preparation of 2,4,5,7-tetraaminopyrimido[5,4g]pteridine, to a process for the production thereof and to the use thereof for colouring high molecular weight organic material and in the production of printing colorants, printing pastes or printing inks.

Pteridines, for example including 2,4,5,7-tetraminopyrimido[5,4g]pteridine, and their use as pigments are known. For certain applications, however, especially the colouring of specific plastics, such as polyolefins or PVC, or the use of such pigments as colour components in printing colorants, or inks, that can be used both in printing processes and in inkjet printing processes, it has been found that the commercial preparations available today do not fully meet all requirements, especially in terms of the required dispersibility and the hitherto unsatisfactory colour strength associated therewith.

There is accordingly a need for new forms or preparations of pteridine pigments that form stable dispersions suitable for use in printing colorants, printing pastes and printing inks or ink-jet inks, that produce tinctorially strong colorations and that exhibit good allround fastness properties, as well as a need for production processes that result in those forms or preparations.

Surprisingly, it has now been found that the preparation of 2,4,5,7-tetraminopyrimido-[5,4g]pteridine according to the invention substantially meets the above criteria.

The present invention accordingly relates to a pigment preparation that comprises, as component (A), 2,4,5,7-tetraminopyrimido[5,4g]pteridine of formula

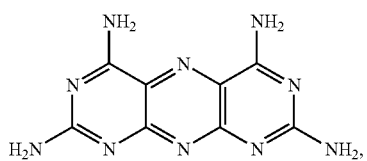

(1)

as component (B), a phosphate compound, and optionally, as component (C), further additives.

The phosphate compounds suitable as component (B) for the pigment preparation according to the invention are, for example, inorganic phosphates, and also polyphosphates, preferably organic cyclic metaphosphates, or linear metaphosphates, especially hexametaphosphate.

The above phosphates may be in the form of free acids or, preferably, in the form of salts, such as, for example, $Na^+$, $NH_4^+$, $K^+$ or $N(R,R_1R_2R_3)^+$ salts, R to $R_3$, each independently of the others, being hydrogen or $C_1$-$C_{12}$alkyl, especially $C_1$-$C_4$alkyl.

Preferably, the pigment preparation according to the invention comprises, as component (C), a) waxes, such as a polyethylene waxes, polypropylene waxes, glycol esters, polyethylene glycols (PEG), especially PEG 900 to 1800, and/or b) surfactants, such as sorbitan derivatives, especially sorbitan monolaurate, glycerol esters or lanolin-based derivatives and/or c) dispersants, especially polymeric dispersants containing groups having affinity for pigments, wherein the polymeric dispersants may be in the form of homopolymers or copolymers and rare especially high molecular weight copolymers containing groups having affinity for pigments, and/or d) polymeric resins as binders.

The production of the pigment preparation according to the invention is carried out in a plurality of steps in accordance with the following scheme:

First step:

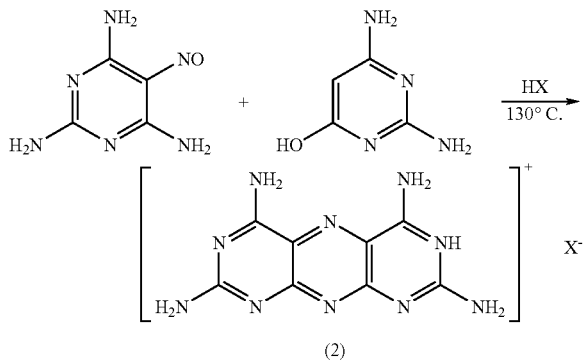

Second step:

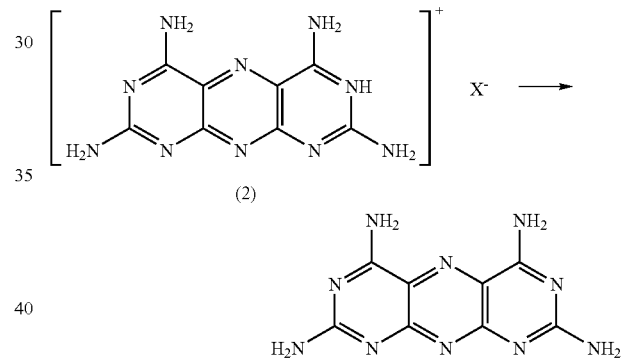

wherein HX is an acid and $X^-$ is an acid anion.

The first step is known, for example, from WO/2001 029040; the second step, which is like-wise known from that document, is modified in accordance with the invention in the manner described below:

For the production of a pigment preparation suitable for colouring high molecular weight organic material of natural or synthetic origin, especially for colouring pure or substituted polyolefins, first of all component (B), for example hexametaphosphate, is added to a moist press cake of the compound of formula

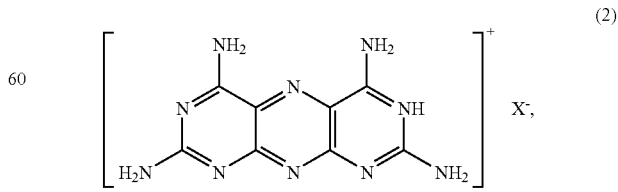

(2)

obtained from the first step, wherein $X^-$ is an acid anion,

NaOH and then optionally component (C), for example sorbitan monolaurate, are added to the mixture at room temperature, heating is carried out and the resulting pigment preparation is isolated after filtration and drying.

For the production of a pigment preparation suitable for use in printing colorants, printing pastes or printing inks, first of all component (B), for example hexametaphosphate, and optionally component (C), for example sorbitan monolaurate, are added in any order to a moist press cake of the compound of formula (2) obtained from the first step, NaOH is added to the mixture at room temperature, heating is carried out and the resulting pigment preparation is isolated after filtration and drying.

For the production of a pigment preparation suitable for use in ink-jet inks, first of all a moist press cake of the compound of formula (2) obtained from the first step is dispersed in water with the aid of dispersants, and then component (B), for example hexametaphosphate, and NaOH are added in any order at slightly elevated temperature.

For the production of the pigment preparation according to the invention, the compound of formula (2) may be either in solid form, for example in the form of a powder or granules, or in the form of a crude pigment obtained directly from synthesis.

The starting material preferably used is a crude pigment that has not been dried. The pigment can be used, for example, in the form of a moist press cake, for example one having a residual moisture content of from 5 to 60% by weight, preferably a residual moisture content of from 20 to 40% by weight. It is likewise possible for the mixture obtained in the reaction for the production of the pigment to be further used directly.

High molecular weight organic material to be coloured in accordance with the invention may be of natural or synthetic origin. Such materials may be, for example, natural resins or drying oils, rubber or casein, or may be modified natural materials, such as chlorinated rubber, oil-modified alkyd resins, viscose, or cellulose ethers or esters, such as cellulose acetate, cellulose propionate, cellulose acetobutyrate or nitrocellulose, but are especially completely synthetic organic polymers (both thermosetting plastics and thermoplastics), as obtained by polymerisation, polycondensation or polyaddition. From the class of the polymerisation resins mention may be made especially of pure polyolefins, such as polyethylene, polypropylene or polyisobutylene, and substituted polyolefins, such as polymerisation products of vinyl chloride, vinyl acetate, styrene, acrylonitrile, acrylic acid and/or methacrylic acid esters, or butadiene, and also copolymerisation products of the said monomers, especially ABS (acrylonitrilelbutadiene/styrene) or EVA (ethylenetinyl acetate).

The pigment preparation according to the invention is suitable especially for colouring pure or substituted polyolefins.

From the series of the polyaddition resins and polycondensation resins mention may be made of the condensation products of formaldehyde with phenols, the so-called phenoplasts, and the condensation products of formaldehyde with urea, thiourea and melamine, the so-called aminoplasts, the polyesters used as surface-coating resins, either saturated, such as alkyd resins, or unsaturated, such as maleic resins, and also the linear polyesters and polyamides or silicones.

The pigment preparation according to the invention is especially suitable for colouring plastics, preferably polyvinyl chloride and polyolefins, especially polypropylene. More especially, the pigment preparation according to the invention is suitable for colouring synthetic fibres, especially polypropylene fibres.

In coloured products, for example of polyvinyl chloride or polyolefins, the pigment preparation according to the invention is distinguished by good allround pigment properties, such as good fastness to migration, to heat, to light and to weathering and also good hiding power and high colour strength, but especially by good dispersibility with an especially low after-wiping effect.

The invention accordingly relates also to a process for mass-colouring high molecular weight materials which comprises admixing with the high molecular weight organic material from 0.01 to 30% by weight of a pigment preparation according to the invention. Advantageously, the pigment is admixed prior to the shaping of the high molecular weight organic material. Special preference is given to a process in which the high molecular weight organic material, when being shaped, is in the form of a plastic mass or melt, for example at a temperature of from 100 to 350° C., preferably at a temperature of from 150 to 330° C., especially from 150 to 300° C. in the case of plastic masses and from 250 to 330° C. in the case of melts.

The said high molecular weight compounds may be present as single compounds or in mixtures as plastic masses or melts, which can optionally be spun to form fibres.

They may also be in the form of their monomers or in the polymerised state in dissolved form as film formers or binders for surface-coating compositions or for printing inks, e.g. boiled linseed oil, nitrocellulose, alkyd resins, melamine resins, urea-formaldehyde resins or acrylic resins.

The pigmenting of high molecular weight, organic materials using the pigment preparation according to the invention is effected, for example, by admixing such a pigment preparation, optionally in the form of a masterbatch, with such substrates using, for example, roll mills or mixing or grinding apparatus. The pigmented material is usually then brought into the desired final shape according to methods known per se, such as calendering, compression moulding, extrusion, coating, pouring or injection moulding. In order to produce non-rigid mouldings or to reduce their brittleness, it is frequently desirable to incorporate so-called plasticisers into the high molecular weight compounds prior to shaping. There may be used as plasticisers, for example, esters of phosphoric acid, phthalic acid or sebacic acid. In the process according to the invention, the plasticisers can be incorporated into the polymers before or after the incorporation of the pigment preparation. It is also possible, in addition to adding the pigment preparation according to the invention to the high molecular weight organic materials, to add fillers and other colour-imparting constituents, such as white, coloured or black pigments and effect pigments, in the respective desired amounts, in order to achieve different colour shades.

A further embodiment accordingly relates also to the use of the pigment preparation according to the invention for mass-colouring high molecular weight organic material in a manner known per se, for example by mixing together the pigment preparation according to the invention and the high molecular weight organic material.

The colorations obtained, for example in plastics, fibres, surface-coatings or prints, are distinguished by a greenish-yellow colour shade, very high colour strength, high saturation, very good dispersibility, good fastness to overspraying, to migration and to heat, as well as to light and to weathering.

For colouring plastics, especially plastics based on pure or substituted polyolefins, there are preferably used pigment preparations that comprise 2,4,5,7-tetraminopyrimido[5,4g] pteridine of formula (1), sodium hexametaphosphate and sorbitan monolaurate.

For pigmenting surface-coating compositions and printing inks, the pigment preparation according to the invention is generally finely dispersed or dissolved, optionally together with customary additives, such as fillers, other pigments, siccatives or plasticisers, in an organic and/or aqueous solvent or solvent mixture. It is also possible to use a procedure in which the individual components are dispersed or dissolved separately or in which a plurality thereof are dispersed or dissolved together, and only then all of the components combined.

A further embodiment accordingly relates also to the use of the pigment preparation according to the invention in the production of printing colorants, printing pastes or printing inks.

The present invention relates also to the use of the pigment preparations according to the invention in the production of printing colorants, printing pastes or printing inks, optionally also together with other colorants, as well as to the printing colorants, printing pastes and printing inks obtained.

The amount of the pigment preparation according to the invention to be added to the printing pastes is dependent on the desired colour strength; in general, amounts of from 0.01 to 15% by weight, especially from 0.02 to 10% by weight, based on the material to be printed, have proved suitable.

For printing, the customary thickeners will be used, e.g. modified or unmodified natural products, for example alginates, British gum, gum arabic, crystal gum, locust bean flour, tragacanth, carboxymethyl cellulose, hydroxyethyl cellulose, starch or synthetic products, for example polyacrylamides, polyacrylic acid or copolymers thereof, or polyvinyl alcohols.

The printing pastes also, if desired, comprise acid donors, such as butyrolactone or sodium hydrogen phosphate, preservatives, sequestering agents, emulsifiers, organic solvents, e.g. alcohols, esters, toluene and xylene, binders, e.g. nitrocellulose and vinyl copolymers, plasticisers, e.g. citric acid, oxidising agents, deaerating agents, light stabilisers and UV stabilisers.

For printing, the printing paste is applied directly to the entire surface of the material to be printed or to parts thereof, printing machines of the customary type, e.g. flexographic/intaglio printing, offset printing, rotary or flat-film printing machines, advantageously being used. The printing pastes according to the invention are also suitable for transfer printing.

The pigment preparations according to the invention impart to the mentioned materials, especially to polyester material, level colour shades having very good in-use fastness properties.

The present invention relates also to the use of the preparations according to the invention in the production of inks, for example for inks used in an ink-jet process.

The total amount of the pigment preparation according to the invention present in the inks is preferably from 0.5 to 35% by weight, especially from 1 to 30% by weight and more especially from 1 to 20% by weight, based on the total weight of the ink. The especially preferred lower limit is 1.2% by weight, especially 1.5% by weight. The especially preferred upper limit is 15% by weight, especially 10% by weight.

The inks usually also comprise a solubiliser or a humectant, such as a water-miscible organic solvent, for example a $C_1$-$C_4$alcohol, such as methanol, ethanol, n-propanol, isopropanol, n-butanol, sec-butanol, tert-butanol or isobutanol; an amide, e.g. dimethylformamide or dimethylacetamide; a ketone or ketone alcohol, e.g. acetone, methyl isobutyl ketone, diacetone alcohol; an ether, e.g. tetrahydrofuran or dioxane; a nitrogen-containing heterocyclic compound, e.g. N-methyl-2-pyrrolidone or 1,3-dimethyl-2-imidazolidone; a polyalkylene glycol, preferably a low molecular weight polyethylene glycol having a molecular weight of from 100 to 800, e.g. diethylene glycol, triethylene glycol, tetraethylene glycol, polyethylene glycol 200, polyethylene glycol 300, polyethylene glycol 400 or polyethylene glycol 600, especially having a molecular weight of from 150 to 400, or a low molecular weight polypropylene glycol, e.g. dipropylene glycol, tripropylene glycol, polypropylene glycol P 400 or polypropylene glycol P 425; an alkyl ether of a polyalkylene glycol, e.g. diethylene glycol monobutyl ether, 2-(2-methoxyethoxy)ethanol, 2-(2-ethoxyethoxy)ethanol, 2-[2-(2-methoxyethoxy)ethoxy]ethanol or 2-[2-(2-ethoxyethoxy)ethoxy]ethanol; a $C_2$-$C_6$alkylene glycol or a thioglycol, e.g. ethylene glycol, propylene glycol, butylene glycol, 1,5-pentanediol, thiodiglycol, hexylene glycol; or a further polyol, e.g. glycerol or 1,2,6-hexanetriol; or a $C_1$-$C_4$alkyl ether of a polyhydric alcohol, e.g. 2-methoxyethanol or 1-methoxypropan-2-ol. The inks may further comprise ε-caprolactam as solubiliser.

As humectants in the inks according to the invention there also come into consideration, for example, urea or a mixture of sodium lactate (advantageously in the form of a 50 to 60% aqueous solution) and glycerol and/or propylene glycol in amounts of preferably from 0.1 to 30% by weight, especially from 2 to 30% by weight.

Preferably, the inks comprise at least one solubiliser or one humectant from the group consisting of polyethylene glycols having a molecular weight of from 150 to 400, diethylene glycol monobutyl ether, N-methyl-2-pyrrolidone and glycerol and especially tetraethylene glycol, polyethylene glycol 400, diethylene glycol monobutyl ether and glycerol, usually in an amount of from 2 to 30% by weight, especially from 5 to 25% by weight and more especially from 20 to 25% by weight, based on the total weight of the ink.

The inks may comprise thickeners of natural or synthetic origin, inter alia for the purpose of adjusting the viscosity.

Examples of thickeners that may be mentioned include commercially available alginate thickeners, starch ethers and locust bean flour ethers, especially sodium alginate on its own or in admixture with modified cellulose, for example methyl, ethyl, carboxymethyl, hydroxy-ethyl, methylhydroxyethyl, hydroxypropyl or hydroxypropylmethyl cellulose, especially with preferably from 20 to 25 percent by weight carboxymethyl cellulose. There may furthermore be mentioned as synthetic thickeners, for example, those based on poly(meth)acrylic acids or poly(meth)acrylamides.

The inks contain such thickeners, for example, in an amount of from 0.01 to 2% by weight, especially from 0.01 to 1% by weight and preferably from 0.01 to 0.5% by weight, based on the total weight of the ink.

The inks may also comprise buffer substances, e.g. borax, borates, phosphates, polyphosphates or citrates: Examples that may be mentioned include borax, sodium borate, sodium tetraborate, sodium dihydrogen phosphate, disodium hydrogen phosphate, sodium tripolyphosphate, sodium pentapolyphosphate and sodium citrate. They are used especially in amounts of from 0.1 to 3% by weight, preferably from 0.1, to 1% by weight, based on the total weight of the ink, in order to establish a pH value of, for example, from 4 to 9, especially from 5 to 8.5.

The inks may comprise surfactants or wetting agents as further additives.

Suitable surfactants or wetting agents include commercially available anionic or non-ionic surfactants.

Furthermore, the inks may in addition comprise customary additives, e.g. anti-foams or especially substances that inhibit fungal and/or bacterial growth. Such additives are usually used in amounts of from 0.01 to 1% by weight, based on the total weight of the ink.

Preservatives that come into consideration include formaldehyde-yielding agents, e.g. para-formaldehyde and trioxane, especially aqueous, approximately 30 to 40% by weight formaldehyde solutions, imidazole compounds, e.g. 2-(4-thiazolyl)benzimidazole, thiazole compounds, e.g. 1,2-benzisothiazolin-3-one or 2-n-octyl-isothiazolin-3-one, iodine compounds, nitrites, phenols, haloalkylthio compounds or pyridine derivatives, especially 1,2-benzisothiazolin-3-one or 2-n-octyl-isothiazolin-3-one.

The inks can be prepared in conventional manner by mixing together the individual consti-tuents, for example in the desired amount of water. Suspended substances and insoluble constituents present in the inks are removed, for example, by filtration through a filter having a pore size of from 0.2 to 0.5 µm.

Inks having a viscosity of from 1 to 40 mPa·s, especially from 1 to 20 mPa·s and preferably from 1 to 10 mPa·s, are preferred.

The pigment preparations preferably used in the production of inks are those comprising 2,4,5,7-tetraminopyrimido[5,4g]pteridine of formula (1), sodium hexametaphosphate, sorbitan monolaurate and a dispersant containing groups having affinity for pigments.

The inks according to the invention are suitable for use in recording systems in which the ink is expressed from a small aperture in the form of droplets and directed onto a planar substrate on which an image is formed. Suitable substrates include, for example, paper, plastics films or textile fibre materials, especially paper or plastics films and more especially paper. Suitable recording systems include, for example, commercially available ink-jet printers for use in paper printing or textile printing.

As examples of paper that can be printed with the inks according to the invention there may be mentioned commercially available ink-jet paper, photo paper, glossy paper, plastics-coated paper, e.g. Epson Ink-jet Paper, Epson Photo Paper, Epson Glossy Paper, Epson Glossy Film, HP Special Ink-jet Paper, Encad Photo Gloss Paper and Ilford Photo Paper. Plastics films that can be printed with the inks according to the invention are, for example, transparent or cloudy/opaque. Suitable plastics films are, for example, 3M Transparency Film. Preference is given to glossy paper, such as, for example, Epson Glossy Paper.

As textile fibre materials there come into consideration especially nitrogen-containing or hydroxy group-containing fibre materials, for example woven textile fabric made of cellulose, silk, wool or synthetic polyamides, especially silk.

In the case of the ink-jet printing method, individual droplets of ink are sprayed onto a substrate from a nozzle in a controlled manner. It is mainly the continuous ink-jet method and the drop-on-demand method that are used for that purpose. In the case of the continuous ink-jet method, the droplets are produced continuously, droplets not required for the printing operation being discharged into a receptacle and recycled. In the case of the drop-on-demand method, on the other hand, droplets are generated as desired and used for printing; that is to say, droplets are generated only when required for the printing operation. The production of the droplets can be effected, for example, by means of a piezo ink-jet head or by thermal energy (bubble jet). For the process according to the invention, printing by means of a piezo ink-jet head is preferred, but preference is given also to printing according to the continuous ink-jet method.

The inks according to the invention are suitable especially as yellow components for multi-colour printing or photoprinting and yield a neutral photo yellow.

The prints produced in accordance with the invention exhibit good fastness to light and good water-fastness properties. They are distinguished especially by a high colour brilliancy and a high colour strength. The inks according to the invention are storage-stable and do not exhibit any precipitation or sedimentation when stored for prolonged periods.

The following Examples serve to illustrate the invention. Unless otherwise indicated, the temperatures are given in degrees Celsius, parts are parts by weight and percentages are percentages by weight. Parts by weight relate to parts by volume in a ratio of kilograms to litres.

EXAMPLE 1

A suspension of 6.20 g of commercial 2,4,6-triamino-5-nitrosopyrimidine (Chemie Uetikon, Germany), 5.15 g of commercial 2,4-diamino-6-hydroxypyrimidine (Fluka, Switzerland) and 11.52 g of commercial toluene-4-sulfonic acid monohydrate in 110 ml of glacial acetic acid (100%) is stirred for 20 hours at 113° C. The reaction mixture is filtered through a hard-paper filter while it is still hot. The moist filter cake, which contains approximately 31.5% by weight of the pyrimido[5,4-g]pteridine salt of formula VI

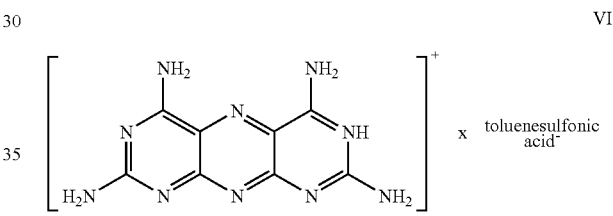

is further processed as indicated in the following Examples.

EXAMPLE 2

200.0 g of the 31.5% filter cake from Example 1 are washed with water and then dispersed in 465 g of water, and 2.92 g of sodium hexametaphosphate (Fluka, Switzerland) and 36.5 g of sorbitan monolaurate (Span 20, Fluka, Switzerland) are added thereto. The conversion to pigment form is brought about by the addition of 67 ml of an aqueous 2M NaOH solution (pH about 12), the mixture being stirred first of all for 30 minutes at room temperature and then for 18 hours at 90° C. After cooling, the suspension is filtered, washed with water until neutral and dried in vacuo at 60° C.

In nitrocellulose printing ink, the pigment obtained gives an intense brilliant yellow coloration.

EXAMPLE 3

Comparison Example 24.2 g of the 31.5% filter cake from Example 1 are washed with water and then dispersed in 50 g of water, and 2.92 g of sodium hexametaphosphate (Fluka, Switzerland) are added thereto. The conversion to pigment form is brought about by the addition of 10 ml of an aqueous 2M NaOH solution (pH about 12), the mixture being stirred first of all for 30 minutes at room temperature and then for 18 hours at 90° C. After cooling, the suspension is filtered, washed with water until neutral and dried in vacuo at 60° C.

In nitrocellulose printing ink, the pigment obtained gives only a pale coloration with a strong tendency towards sedimentation.

EXAMPLE 4

Comparison Example 17.7 g of the 31.5% filter cake from Example 1 are washed with water and then dispersed in 50 g of water, and 36.5 g of sorbitan monolaurate (Span 20, Fluka, Switzerland) are added thereto. The conversion to pigment form is brought about by the addition of 10 ml of an aqueous 2M NaOH solution (pH about 12), the mixture being stirred first of all for 30 minutes at room temperature and then for 18 hours at 90° C. After cooling, the suspension is filtered, washed with water until neutral and dried in vacuo at 60° C.

In nitrocellulose printing ink, the pigment obtained gives only a pale coloration with a strong tendency towards sedimentation.

EXAMPLE 5

141.0 g of the 31.5% filter cake from Example 1 are washed with water and then dispersed in 300 g of water, and 37.4 g of sorbitan monolaurate (Span 20, Fluka, Switzerland) are added thereto. The conversion to pigment form is initiated by the addition of 51.3 ml of an aqueous 2M NaOH solution (pH about 12). After 60 minutes, 2.1 g of sodium hexametaphosphate (Fluka, Switzerland) are added, and the mixture is heated to 90° C. and stirred for 2 hours. After cooling, the suspension is filtered, washed with water until neutral and dried in vacuo at 60° C.

In polyolefins and in PVC, the pigment obtained gives an intense brilliant coloration with excellent dispersibility.

EXAMPLE 6

200 g of a high molecular weight block copolymer containing groups having affinity for pigments and 290 g of water are added to 466.3 g of the 31.5% filter cake from Example 1 and dispersed for 24 hours with the aid of a Dynomill. 221 g of the resulting dispersion are heated to 40° C. with stirring, and 22 ml of an alkaline solution containing 16% by weight NaOH and 4% by weight sodium hexametaphosphate (Fluka, Switzerland) are added. The suspension is filtered, introduced into 220 ml of water, and further stirred at 40° C. for 80 minutes. Subsequently, a further 5 ml of the above alkaline solution is added and stirring is continued for a further 20 minutes. 100 g of Amberlite MB 150 (an ion exchange resin based on styrene/divinylbenzene copolymers, Rohm and Haas) are subsequently added and the mixture is stirred for a further 2 hours. The Amberlite MB 150 is then filtered off.

430 g of a pigment concentrate with an absorption maximum at 460 nm are obtained. To 150 g of that pigment concentrate there are added 68.5 g of water, 36 g of 1,2-propanediol, 18 g of glycerol, 0.5 g of polyoxyethylene (10) lauryl ether, 6 g of caprolactam and 21 g of N-methylpyrrolidone. The mixture is centrifuged for 30 minutes at 8 000 rpm and then filtered using a 0.7 micrometer fibre-glass filter, resulting in an ink having a viscosity of 4.6 mPas.

What is claimed is:

1. A pigment preparation that comprises,
   as component (A), 2,4,5,7-tetraaminopyrimido[5,4g]pteridine of formula

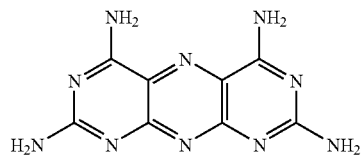

as component (B), a phosphate compound
as component (C), a sorbitan surfactant,
and optionally, further additives selected from the group consisting of waxes, dispersants, other surfactants and polymeric resins.

2. A pigment preparation according to claim 1, wherein component (B) is an inorganic phosphate, a polyphosphate, an organic, cyclic metaphosphate, or a linear metaphosphate.

3. A pigment preparation according to claim 1 which comprises a wax, a glycol ester or a polyethylene glycol.

4. A pigment preparation according to claim 1 which comprises a glycerol ester or a lanolin-based derivative.

5. A pigment preparation according to claim 1 which comprises a dispersant.

6. A pigment preparation according to claim 1, wherein the sorbitan surfactant is sorbitan monolaurate.

7. A pigment preparation according to claim 2, wherein component (B) is in the form of a sodium or ammonium salt.

8. A pigment preparation according to claim 7, wherein component (B) is a hexametaphosphate.

9. A method of mass-colouring high molecular weight organic material that comprises incorporating into the high molecular weight organic material a pigment preparation according to claim 1.

10. A printing colorant, a printing paste or a printing ink that comprises a pigment preparation according to claim 1.

11. A printing colorant or printing paste that comprises a pigment preparation according to claim 1.

12. A printing ink that comprises a pigment preparation according to claim 1.

13. A process for the production of a pigment preparation, which pigment preparation comprises,
    as component (A), 2,4,5,7-tetraaminopyrimido[5,4g]pteridine of formula

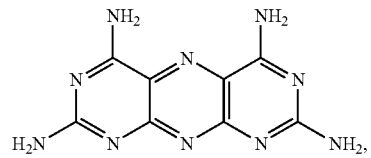

as component (B), a phosphate compound
and optionally,
as component (C), further additives,
which process comprises adding a phosphate compound component (B) to a compound of formula

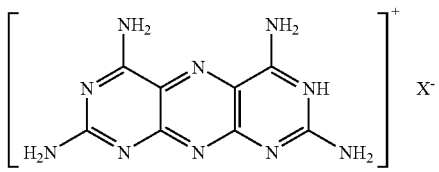

wherein X⁻ is an acid anion,
adding NaOH and then optionally as further additives component (C) to the mixture at room temperature, heating, and isolating the resulting pigment preparation after filtration and drying.

14. A process for the production of a pigment preparation according to claim 13, which comprises adding a phosphate compound component (B) and optionally as further additives component (C) in any order to a compound of formula

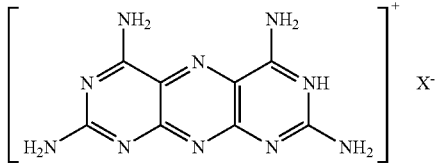

wherein X⁻ is an acid anion,
adding NaOH to the mixture at room temperature, heating, and isolating the resulting pigment preparation after filtration and drying.

15. A process according to claim 13, wherein component (B) is hexametaphosphate, and optional component (C) is sorbitan monolaurate.

16. A process according to claim 14, wherein component (B) is hexametaphosphate, and optional component (C) is sorbitan monolaurate.

17. A process for the production of a pigment preparation according to claim 1, which pigment preparation comprises,
as component (A), 2,4,5,7-tetraaminopyrimido[5,4g]pteridine of formula

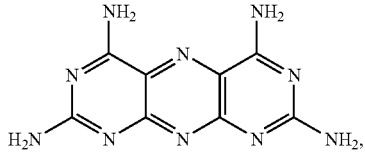

as component (B), a phosphate compound
and optionally,
as component (C), further additives,
which process comprises dispersing in water, with the aid of a dispersant, a compound of formula

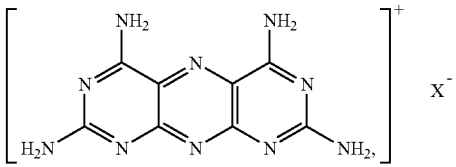

wherein X⁻ is an acid anion,
then heating and adding a phosphate compound component (B) and NaOH in any order.

18. A process according to claim 17, wherein component (B) is hexametaphosphate.

* * * * *